United States Patent [19]

Dixon et al.

[11] Patent Number: 5,363,641
[45] Date of Patent: Nov. 15, 1994

[54] INTEGRATED AUXILIARY POWER SYSTEM

[75] Inventors: James T. Dixon, Jupiter; Marvin R. Glickstein, North Palm Beach, both of Fla.

[73] Assignee: United Technologies Corporation, Hartford, Conn.

[21] Appl. No.: 103,502

[22] Filed: Aug. 6, 1993

[51] Int. Cl.$^5$ .............................................. F02C 7/26
[52] U.S. Cl. .................................. 60/39.02; 60/39.07; 60/39.142; 60/226.1; 60/736
[58] Field of Search ............... 60/39.02, 39.07, 39.141, 60/39.142, 39.15, 39.83, 226.1, 736; 244/53 A, 58; 454/71, 72, 73, 74, 76

[56] References Cited

U.S. PATENT DOCUMENTS

| | | | |
|---|---|---|---|
| 2,777,301 | 1/1957 | Kuhn | 60/39.07 |
| 4,091,613 | 5/1978 | Young | 60/39.07 |
| 4,503,666 | 3/1985 | Christoff | 60/39.07 |
| 4,514,976 | 5/1985 | Christoff | 60/39.07 |
| 4,684,081 | 8/1987 | Cronin | 60/39.141 |
| 5,125,597 | 1/1992 | Coffinberry | 454/71 |
| 5,137,230 | 8/1992 | Coffinberry | 60/39.142 |

Primary Examiner—Louis J. Casaregola

[57] ABSTRACT

A method for providing both starting power and thermal management requirements of a vehicle incorporating a gas turbine engine by using the same unit to alternately provide both starting power and cooling air.

8 Claims, 2 Drawing Sheets

INTEGRATED AUXILIARY POWER SYSTEM

FIELD OF THE INVENTION

This invention relates to vehicles which are powered by gas turbine engines.

BACKGROUND OF THE INVENTION

Weight is a critical factor in the design of vehicles such as aircraft, since the weight of an aircraft directly affects the fuel consumption of the aircraft for any given mission. Therefore, aircraft designers are constantly searching for ways to reduce the weight of current aircraft. The simplest way to reduce weight is, of course, to eliminate some of the least critical, or redundant components on aircraft.

Redundant components are often used to provide an added margin of safety in those situations where failure of the primary components may result in loss of an aircraft or severe injury to the passengers or crew of the aircraft. Therefore attaining weight reduction by eliminating redundant components increases overall risk and is generally undesirable. Elimination of the least critical components, while not necessarily impacting safety, may result in a degradation of performance of the aircraft which is unacceptable.

What is needed is a method of reducing the weight of an aircraft without significantly degrading the performance thereof.

SUMMARY OF THE INVENTION

It is therefore an object of the present invention to provide a method of reducing the weight of an aircraft without significantly degrading the performance thereof.

According to the present invention a method is disclosed in which an auxiliary power unit is used to initially start an engine, and once started, provides cooling air for heat absorbing components of the vehicle or engine. The method also uses an auxiliary burner to provide the combustion products which are expanded through the auxiliary power unit to start the engine, and a heat exchanger to cool air prior to that air being expanded through the turbine of the auxiliary power unit. The method of the present invention results in a reduction in the overall weight of an aircraft without significantly degrading the performance thereof.

The foregoing and other features and advantages of the present invention will become more apparent from the following description and accompanying drawings.

DETAILED DESCRIPTION OF THE INVENTION

Figure 1:
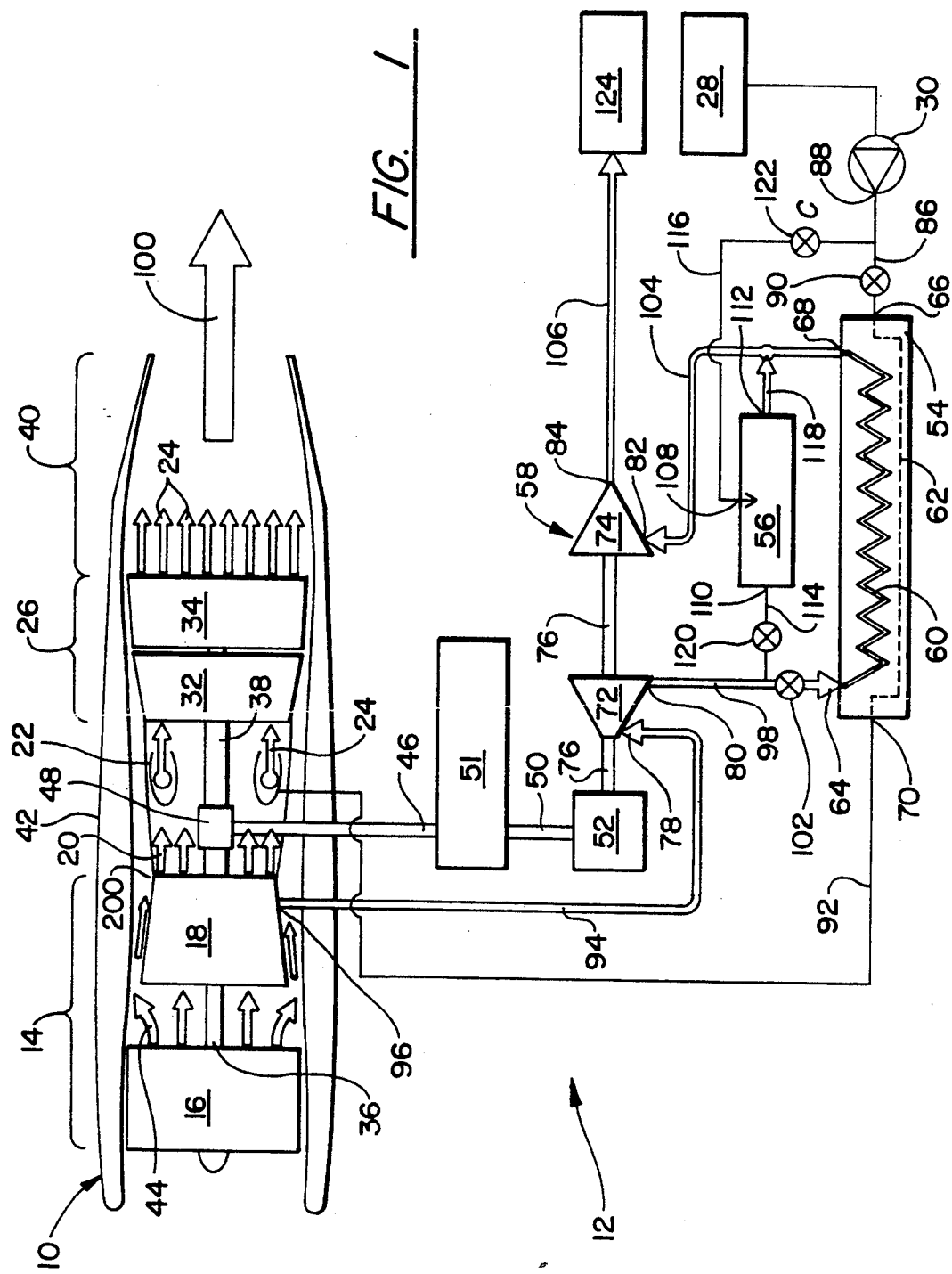
FIG. 1 is a schematic view of the components of the first embodiment of the method of the present invention as used with a turbofan gas turbine engine.

The present invention provides a method for utilizing a dual-purpose integrated component to provide both thermal management and auxiliary starting power for use in gas turbine engines. In the preferred embodiment of the present invention, as shown in FIG. 1, the method is shown and described in terms of a turbofan engine 10 for a vehicle 12 such as an aircraft. The engine 10 includes, in serial flow arrangement, a compressor section 14 for compressing ambient air, and the compressor section 14 has, in serial flow arrangement, a low pressure compressor 16, or "fan", and a high pressure compressor 18, to produce compressed air 20. Aft of the compressor section 14 is a combustion section 22 for mixing fuel with the compressed air 20 and igniting the fuel and compressed air 20 to produce combustion products 24. Aft of the combustion section 22 is a turbine section 26 for expanding the combustion products 24 and driving the compressors 16, 18 of the compressor section 14. A fuel source 28 is provided which supplies the fuel to the engine 10 via a fuel pump 30. The fuel source 28 is essentially at ambient conditions, while the combustion products 24 are at a substantially higher temperature.

The turbine section 26 of the turbofan also has in serial flow arrangement, a high pressure turbine 32 and a low pressure turbine 34. The low pressure turbine 34 drives the fan 16 via the low shalt 36 which connects the low pressure turbine 34 to the fan 16, and the high pressure turbine 32 drives the high compressor 18 via the high shaft 38 which connects the high pressure turbine 32 to the high compressor 18. Aft of the turbine section 26 is an exhaust section 40 for conveying the combustion products 24 from the turbine section 26 and out of the gas turbine engine 10. A bypass duct 200, the radially outer boundary of which is defined by the engine case 42, connects the exhaust section 40 to the outlet of the low compressor 16 to permit fan air 44 to bypass the high compressor 18, combustion section 22, and turbine section 26.

As shown in FIG. 1, the high shaft 38 is connected to one end of a drive shaft 46 via a first gearbox 48. The other end of the starter shaft is connected to a clutch shaft 50 via a second gearbox 51, the purpose of the second gearbox 51 being to increase or decrease the rotational velocity of the drive shaft 46 relative to the clutch shaft 50. The clutch shaft 50 is connected to a clutch 52, the purpose of which is discussed below.

The method also utilizes a heat exchanger 54, an auxiliary burner 56, and an auxiliary power unit 58. The heat exchanger 54 has first 60 and second 62 flow paths extending therethrough, and each flow path has an inlet 64, 66 and an outlet 68, 70. The auxiliary unit 58 includes a starter compressor 72 and a starter turbine 74, and the starter turbine 74 is connected to the starter compressor 72 by an auxiliary shaft 76 to provide power thereto. The auxiliary shaft 76 is also connected to the clutch 52, for selectively coupling, and decoupling the auxiliary shaft 76 with the clutch shaft 50 by selectively engaging, and disengaging, the clutch 52. The starter compressor 72 has an inlet 78 and an outlet 80, and the starter turbine 74 likewise has an inlet 82 and an outlet 84.

A first conduit 86 is connected at one end to the fuel pump outlet 88 and at the other end to the inlet 66 of the second flow path 62 of the heat exchanger 54. The first conduit 86 includes a fourth valve 90 for selectively controlling the flow of fuel therethrough. The outlet of the second flow path 70 of the heat exchanger 54 is connected by a second conduit 92 to the combustion section 22 of the engine 10 to deliver the fuel exiting the second flow path 62 to the combustion section 22.

The inlet 78 of the starter compressor is connected by a third conduit 94 to a high compressor bleed 96 that diverts compressed air from the high compressor 18.

The outlet 80 of the starter compressor 72 is connected by a fourth conduit 98 to the inlet 64 of the first flow path of the heat exchanger 54. The fourth conduit 98 includes a third valve 102 to selectively regulate flow of compressed air that flows through the fourth conduit 98. The outlet 68 of the first flow path of the heat exchanger is connected by a fifth conduit 104 to the inlet 82 of the starter turbine 74 to deliver compressed air exiting the first flow path 60 of the heat exchanger thereto. The outlet 84 of the starter turbine 74 is connected to a sixth conduit 106 which routes the compressed air away from the starter turbine 74.

The auxiliary burner 56 has a fuel inlet 108, an air inlet 110, and an exhaust outlet 112. A first supply line 114 connects outlet 80 of the starter compressor 72, via the fourth conduit 98, to the air inlet 110 of the auxiliary burner 56 for supplying air thereto. The first supply line 114 is connected to the fourth conduit between the third valve 102 and the outlet 80 of the starter compressor 72. A starter fuel supply line 116 connects the fuel inlet 108 of the auxiliary burner 56 to the outlet of the fuel pump 88 via the first conduit 86. A turbine supply line 118 connects the exhaust outlet 112 of the auxiliary burner 56 to the inlet 82 of the starter turbine 74 via the fifth conduit 104. The first supply line 114 includes a first valve 120 for controlling the flow of air therethrough, and the starter fuel supply line 116 includes a second valve 122 for controlling the flow of fuel therethrough.

The method of the present invention is practiced in two modes: 1) the start mode, and 2) the operating mode. In the start mode, the clutch 52 is engaged to rotationally link the auxiliary shaft 76 and high shaft 38 via the gearboxes 48, 51, shafts 46, 50, and clutch 52. The first 120 and second 122 valves are then opened and the third 102 and fourth 90 valves are closed. Fuel is pumped to the auxiliary burner 56 through the starter fuel supply line 116 and sprayed into the auxiliary burner 56 so as to divert air from the compressor section 14 by drawing it through the third conduit 94, the starter compressor 72, the fourth conduit 98, the first supply line 114, and into the auxiliary burner 56. This air is preferably drawn in by means of an ejector which sprays one or more streams of fuel into the inlet of a venturi, thereby drawing air adjacent the inlet of the venturi into the venturi. Such ejectors are well known in the burner art, and are therefore beyond the scope of this invention.

The air and fuel in the auxiliary burner 56 are then combusted, thereby producing auxiliary burner combustion products which are delivered to the inlet 82 of the starter turbine 74 via the turbine supply line 118 and the fifth conduit 104. The auxiliary burner combustion products flow through, and thereby accelerate rotationally, the starter turbine 74, the starter shaft 76, and the starter compressor 72 attached thereto. As the rotational velocity of the starter compressor 72 increases, the mass flow of air delivered to the auxiliary burner 56 from the starter compressor 72 increases, increasing the pressure at which the auxiliary burner combustion products are delivered to the starter turbine inlet 82. This in turn provides more energy to drive the starter turbine 74, and the starter shaft 76 to which it is attached. Since the high shaft 38 and starter shaft 76 are linked as described above, the high shaft 38 accelerates rotationally with the acceleration of the starter shaft 76. Rotation of the high compressor causes compression of the air prior to its delivery to the inlet 78 of the starter compressor, thereby further increasing the temperature and pressure of the compressed air flowing from the starter compressor 72, and therefore the temperature and pressure of the air delivered to the starter turbine inlet 82. This rotational acceleration of the starter turbine 74 and the linked high shaft 38 continues until the rotational velocity of the high shaft 38 reaches a predetermined speed, that being the speed at which combustion within the combustion section 22 can maintain the rotational speed of the high shaft 38. The fourth valve 90 is then opened, and fuel is pumped to the inlet 66 of second flow path, flowed through the second flow path 62, and flowed out the outlet 70 of the second flow path. The fuel is then delivered to the combustion section 22 through the second conduit 92. Compressed air flowing from the high compressor 18 into the combustion section 22 is mixed with the fuel and ignited, producing combustion products 24 which are expanded through the turbine section 26, thereby accelerating the high shaft 38.

Once the high shaft 38 has accelerated rotationally to the velocity at which the engine cycle becomes self-sustaining (i.e. more energy is being extracted from the engine combustion products by the turbine section 26 than is needed to power the compressor section 14), the second mode of the method is activated by disengaging the clutch 52 so that the starter shaft 76 and the high shaft 38 are no longer rotationally linked. The first 120 and second 122 valves are immediately closed and the third valve 102 is opened. The opening of the third valve causes the portion compressed air diverted from the compressor section 14 and further compressed in the starter compressor 72 to be delivered to the inlet 64 of the first flow path. The portion then flows through the first flow path 60 of the heat exchanger 54. Within the heat exchanger 54, the fuel acts as the coolant, and the portion of compressed air is cooled simultaneously with the heating of the fuel flowing through the second flow path 62 thereof. The fuel then exits the second flow path 62 of the heat exchanger 54 through the outlet 70 thereof, and the portion of compressed air then exits the first flow path 60 through the outlet 68 thereof.

The portion of compressed air exiting the first flow path 60 of the heat exchanger 54 is delivered to the starter turbine 74 through the fifth conduit 104 and expanded through the starter turbine 74, thereby further reducing the temperature of the portion of compressed air and producing work to drive the starter compressor 72 via the starter shall 76. The portion of compressed air exiting the starter turbine 74 is then routed through the sixth conduit 106 and is available for cooling engine components 124. Operation continues in the second mode until it is desired to use the auxiliary burner 56 again.

Figure 2:
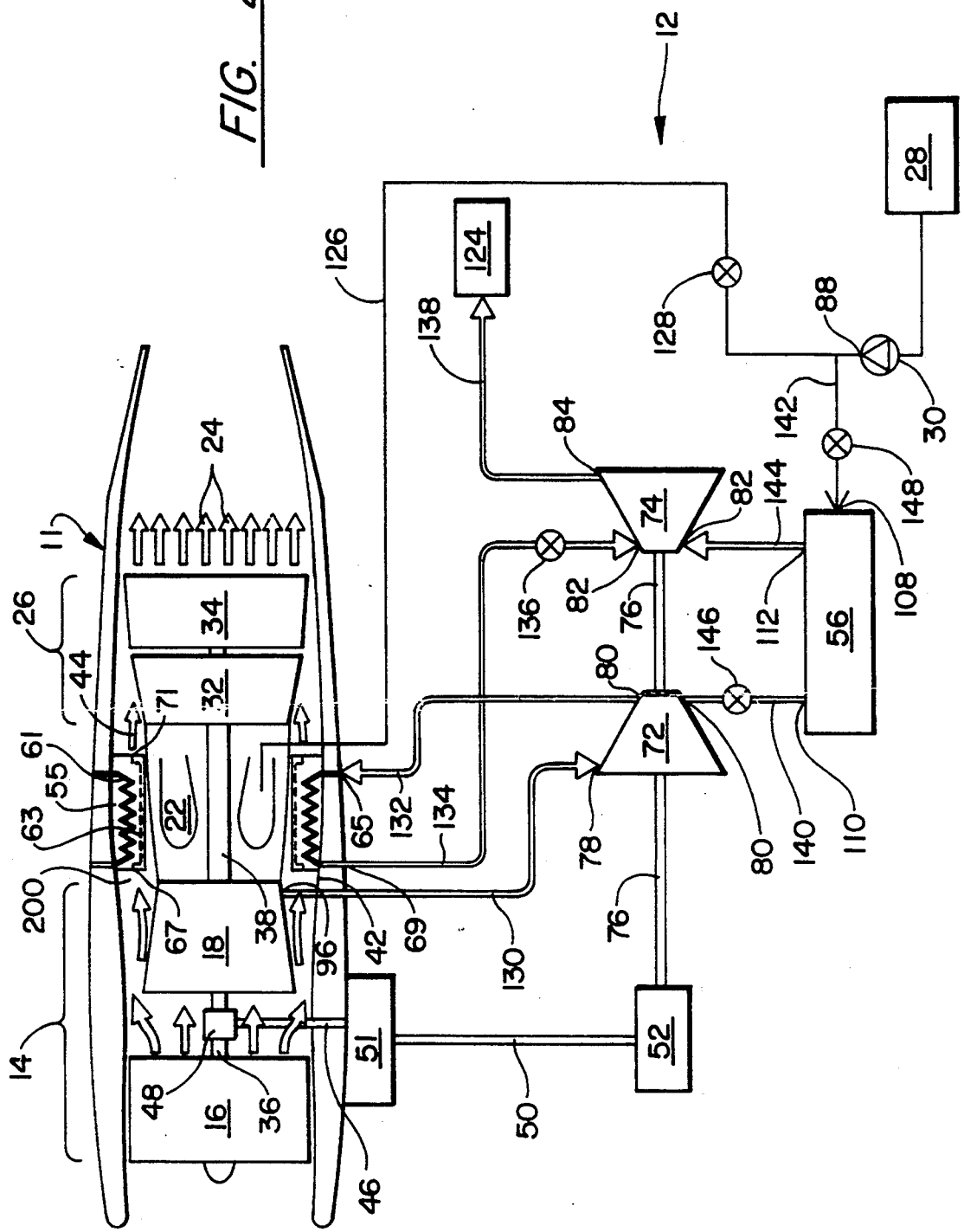
FIG. 2 is a schematic view of the components of the second embodiment of the method of the present invention as used with a turbofan gas turbine engine.

FIG. 2 illustrates a second embodiment of the method of the present invention. As compared to the turbofan 10 of the first embodiment, the turbofan 11 of the second embodiment utilizes an annular bypass heat exchanger 55 located in the bypass duct 200 between the combustion section 22 and the engine case 42. The bypass heat exchanger 55 has first 61 and second 63 flow paths extending therethrough, and each flow path 61, 63 has an inlet 65, 67 and an outlet 69, 71. The second flow path 63 of the bypass heat exchanger 55 is exposed to the fan air 44 flowing through the bypass duct 200, and some of the fan air 44 flows through the second flow path 63. The auxiliary burner 56, fuel pump 30, auxiliary unit 58, clutch 52, gearboxes 48, 51, and associated shafts 36, 38, 46, 50 of the second embodiment are similar to those shown in the first embodiment except that the first gearbox 48 is connected to the low shaft 36 of the engine 11 instead of the high shaft 38.

A first conduit 126 is connected at one end to the fuel pump outlet 88 and at the other end to the combustion section 22 of the engine 11. The first conduit 126 includes a fourth valve 128 for selectively controlling the flow of fuel therethrough. The inlet 78 of the starter compressor 72 is connected by a second conduit 130 to the high compressor bleed 96 that diverts compressed air from the high compressor 18. The outlet 80 of the starter compressor is connected by a third conduit 132 to the inlet 65 of the first flow path 61 of the bypass heat exchanger 55. The outlet 69 of the first flow path 61 of the bypass heat exchanger 55 is connected by a fourth conduit 134 to the inlet 82 of the starter turbine 74 to deliver compressed air exiting the first flow path 61 of the bypass heat exchanger 55 thereto. The fourth conduit 134 includes a third valve 136 to selectively regulate flow of compressed air that flows through the fourth conduit 134. The outlet 84 of the starter turbine is connected to a fifth conduit 138 which routes the compressed air away from the starter turbine.

A first supply line 140 connects outlet 80 of the starter compressor 72 to the air inlet 110 of the auxiliary burner 56 for supplying air thereto. A starter fuel supply line 142 connects the fuel inlet 108 of the auxiliary burner 56 to the outlet 88 of the fuel pump 30 via the first conduit 126. A turbine supply line 144 connects the exhaust outlet 112 of the auxiliary burner 56 to the inlet 82 of the starter turbine 74. As in the first embodiment, the first supply line 140 includes a first valve 146 for controlling the flow of air therethrough, and the starter fuel supply line 142 includes a second valve 148 for controlling the flow of fuel therethrough.

The second embodiment of the method of the present invention is also practiced as a start mode, and an operating mode. In the start mode, the clutch 52 is initially engaged to rotationally link the starter shaft 76 and low shaft 36 via the gearboxes 48, 51, shafts 46, 50 and clutch 52. The first and second valves 146, 148 are then opened and the third and fourth valves 136, 128 are closed. Fuel is pumped to the auxiliary burner 56 through the fuel supply line 142 and sprayed into the auxiliary burner 56 so as to divert air from the compressor section 14 by drawing it through the third conduit 130, the starter compressor 72, the first supply line 140, and into the auxiliary burner 56. This air is preferably drawn in by means of an ejector as discussed above. Alternately, the flow of air into the starter compressor 72, and initial acceleration of the auxiliary unit 58, can be achieved by use of a small starter motor attached to the shaft 76, and driven by electricity or compressed air. The air and fuel are then combusted in the auxiliary burner 56, thereby producing auxiliary burner combustion products which are delivered to the inlet 82 of the starter turbine 74 via the turbine supply line 144. The auxiliary burner combustion products flow through, and thereby accelerate rotationally, the starter turbine 74, the starter shaft 76, and the starter compressor 72 attached thereto. As the rotational speed of the starter compressor 72 increases, the mass flow of air delivered to the auxiliary burner 56 from the starter compressor 72 increases, increasing the pressure at which the auxiliary burner combustion products are delivered to the starter turbine inlet 82. This in turn provides more energy to drive the starter turbine 74, and the starter shaft 76 to which it is attached. Since the low shaft 36 and starter shaft 76 are linked, the low shaft 36 accelerates rotationally with the acceleration of the starter shaft 76. Rotation of the fan causes compression of the air prior to its delivery to the inlet 78 of the starter compressor, thereby further increasing the temperature and pressure of the compressed air flowing from the starter compressor 72 which in turn provides more energy to accelerate the starter turbine 74. This rotational acceleration of the starter turbine 74 and the linked low shaft 36 continues until the rotational velocity of the low shaft 36 reaches a predetermined speed at which the combustion section can maintain the rotational speed of the low shaft 36. The fourth valve 128 is then opened, and fuel is pumped to the combustion section 22 through the first conduit 126. Compressed air flowing from the high compressor 18 into the combustion section 22 is mixed with the fuel and ignited, producing combustion products 24 which are expanded through the turbine section 26, thereby accelerating the low shaft 36.

Once the low shaft 36 has accelerated rotationally to such a velocity that the engine cycle becomes self-sustaining as described above, the second mode of the method is activated by disengaging the clutch 52 so that the starter shaft 76 and the low shaft 36 are no longer rotationally linked. The first and second valves 146, 148 are immediately closed and the third valve 136 is opened simultaneous with the closing of the first valve 146. The portion of compressed air diverted from the high pressure compressor 18 through the high compressor bleed 96 is further compressed in the starter compressor 72, thereby increasing the pressure and temperature of the portion exiting the outlet 80 of the starter compressor. The opening of the third valve 136 causes the portion of compressed air diverted from the compressor section 14 to flow from the outlet 80 of the starter compressor 72 to the inlet 65 of the first flow path of the bypass heat exchanger 55, and flow through the first flow path 61 thereof. Within the bypass heat exchanger 55 the fan air 44 acts as the coolant, and the portion of compressed air is cooled simultaneously with the heating of the fan air 44 flowing through the second flow path 63 thereof. The fan air 44 then exits the second flow path 63 of the bypass heat exchanger 55 through the outlet 71 thereof, and the portion of compressed air then exits the first flow path 61 through the outlet 69 thereof.

The portion of compressed air exiting the first flow path 61 of the bypass heat exchanger 55 is delivered to the starter turbine 74 through the fifth conduit 144 and expanded through the starter turbine 74, thereby further reducing the temperature of the portion of compressed air and producing work to drive the starter compressor 72 via the auxiliary shall 76. The portion of compressed air exiting the starter turbine 74 is then routed through the sixth conduit 138 and is available for cooling engine components. Operation continues in the second mode until it is desired to use the auxiliary burner 56 again.

The method of the present invention provides a single auxiliary unit to satisfy both starting and cooling requirements in an advanced engine system. This method obtains the benefits of an engine starting system and an air cooling system without incurring the weight penalties of providing two separate systems. The method of the present invention thus represents a significant improvement over the prior art.

Although this invention has been shown and described with respect to a detailed embodiment thereof, it will be understood by those skilled in the art that various changes in form and detail thereof may be made without departing from the spirit and scope of the claimed invention.

We claim:

1. A method of starting a vehicle and cooling heated components thereof, said method comprising:

providing at least one gas turbine engine in said vehicle, said engine having in serial flow arrangement a compressor section having at least one engine compressor for compressing ambient air to produce compressed air, a combustion section, and an engine turbine section having at least one turbine for driving the compressor section via an engine shaft;

providing an auxiliary unit having a starter compressor and a starter turbine, said starter turbine connected to said starter compressor by a starter shaft to drive said starter compressor;

linking rotationally the starter shaft and engine shaft via a mechanical linkage;

accelerating the rotational velocity of the engine shaft by driving the engine shaft with the starter shaft until the engine shaft reaches a predetermined velocity:

pumping fuel to said combustion section, and combusting said fuel and compressed air therein, thereby producing engine combustion products;

driving said engine turbine by expanding the engine combustion products therethrough, thereby driving the connected compressor;

disconnecting the mechanical linkage between the engine shaft and the starter shaft;

driving the starter compressor by expanding a portion of the compressed air through the starter turbine until the portion cools to a temperature cooler than said components; and flowing the expanded portion into contact with the components.

2. The method of claim 1 wherein the step of accelerating the rotational velocity of the engine shaft includes the steps of providing an auxiliary burner, combusting fuel and air from the starter compressor in said auxiliary burner, thereby producing auxiliary burner combustion products, and expanding the auxiliary burner combustion products through the starter turbine, thereby rotating the starter turbine, the starter shaft attached thereto, and the engine shaft linked to the starter shaft.

3. The method of claim 2 wherein the method includes providing a drive shaft, a clutch shaft, first and second gearboxes, and a clutch, said first gearbox connecting the engine shaft to the drive shaft, said second gearbox connecting the drive shaft to the clutch shaft, and said clutch rotationally connecting the clutch shaft to the starter shaft when the clutch is engaged, and the step of linking rotationally the starter shaft and engine shaft via a mechanical linkage includes engaging the clutch.

4. The method of claim 3 wherein the step of linking rotationally the starter shaft and engine shaft is followed by the step of selectively flowing all air output from the starter compressor to the auxiliary burner.

5. The method of claim 2 wherein the step of combusting fuel and air from the starter compressor in said auxiliary burner includes drawing air from said starter compressor to said auxiliary burner simultaneously pumping fuel thereto, and combusting said air and said fuel in said auxiliary burner, thereby producing auxiliary burner combustion products.

6. The method of claim 5 further comprising providing a heat exchanger having first and second flow paths extending therethrough, and the step of disconnecting the mechanical linkage between the engine shaft and the starter shaft includes the steps of flowing all air output from the starter compressor through the first flow path, and delivering said air output exiting said heat exchanger to said starter turbine and expanding said air output through said starter turbine, thereby reducing the temperature of the air and producing work to drive the starter compressor via said starter shaft.

7. The method of claim 6 wherein the fuel is cooler than the air output from the starter compressor, and the step of flowing all air output from the starter compressor through the first flow path includes the step of flowing the fuel through the second flow path thereby simultaneously cooling said portion and heating said fuel through the transfer of heat energy from said portion of air to the fuel.

8. The method of claim 6 wherein the engine further comprises an exhaust section for conveying said engine combustion products from said turbine section and out of said gas turbine engine, and a bypass duct extending between, the said one engine compressor and the exhaust section to provide said compressed air thereto, wherein the heat exchanger is located in the bypass duct and exposed to said compressed air flowing through the by pass duct, and the step of flowing all air output from the starter compressor through the first flow path includes flowing the compressed air flowing through the bypass duct through the second flow path while flowing said air output from the starter compressor through said first flow path, thereby simultaneously cooling said air output and heating said compressed air flowing through said second flow path through the transfer of heat energy from said air output to the compressed air in said second flow path.

* * * * *

UNITED STATES PATENT AND TRADEMARK OFFICE
CERTIFICATE OF CORRECTION

PATENT NO.   :   5,363,641
DATED        :   November 15, 1994
INVENTOR(S)  :   Dixon et al It is certified that error appears in the above-indentified patent and that said Letters Patent is hereby corrected as shown below:

In column 4, line 30, change "portion compressed" to --portion of compressed--.

In column 4, line 48, change "shall 76" to --shaft 76--.

In column 6, line 53, change "shall 76" to --shaft 76--.

In column 8, line 44, change "by pass" to --bypass--.

Signed and Sealed this

Seventh Day of March, 1995

Attest:

BRUCE LEHMAN

Attesting Officer        Commissioner of Patents and Trademarks